United States Patent
Yokose

(10) Patent No.: US 8,600,156 B2
(45) Date of Patent: Dec. 3, 2013

(54) IMAGE PROCESSING APPARATUS, IMAGE PROCESSING METHOD, AND NON-TRANSITORY COMPUTER READABLE MEDIUM STORING IMAGE PROCESSING PROGRAM

(75) Inventor: Taro Yokose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/397,281

(22) Filed: Feb. 15, 2012

(65) Prior Publication Data

US 2013/0058570 A1    Mar. 7, 2013

(30) Foreign Application Priority Data

Sep. 5, 2011    (JP) ................. 2011-192374

(51) Int. Cl.
*G06K 9/36* (2006.01)
*H04N 1/41* (2006.01)

(52) U.S. Cl.
USPC ........... 382/166; 382/232; 382/233; 382/238; 382/239; 375/240; 348/223.1

(58) Field of Classification Search
None
See application file for complete search history.

(56) References Cited

U.S. PATENT DOCUMENTS

| | | | | |
|---|---|---|---|---|
| 5,600,374 A * | 2/1997 | Shikakura | ................ | 375/240.11 |
| 5,701,160 A * | 12/1997 | Kimura et al. | ........... | 375/240.14 |
| 5,701,367 A * | 12/1997 | Koshi et al. | .................... | 382/239 |
| 5,822,463 A * | 10/1998 | Yokose et al. | ................ | 382/251 |
| 5,956,430 A * | 9/1999 | Kunitake et al. | .............. | 382/246 |
| 6,067,382 A * | 5/2000 | Maeda | ........................... | 382/239 |
| 6,236,756 B1 * | 5/2001 | Kimura et al. | ................ | 382/239 |
| 6,798,977 B2 * | 9/2004 | Maeda | ........................ | 386/341 |
| 7,227,998 B2 * | 6/2007 | Nakayama et al. | ........... | 382/232 |
| 7,454,070 B2 * | 11/2008 | Ito et al. | ........................ | 382/232 |
| 7,460,725 B2 * | 12/2008 | Malladi et al. | ................ | 382/240 |
| 7,502,514 B2 * | 3/2009 | Gringeler et al. | ............. | 382/232 |
| 7,539,612 B2 * | 5/2009 | Thumpudi et al. | .......... | 704/200.1 |
| 7,620,256 B2 * | 11/2009 | Yokose | ........................ | 382/239 |
| 7,627,181 B2 * | 12/2009 | Tamura et al. | ................ | 382/232 |
| 7,676,096 B2 * | 3/2010 | Kumar et al. | ................. | 382/232 |
| 8,218,882 B2 * | 7/2012 | Sato | ............................. | 382/232 |
| 8,237,772 B2 * | 8/2012 | Ito et al. | ..................... | 348/14.13 |
| 8,280,177 B2 * | 10/2012 | Kato et al. | .................... | 382/232 |
| 8,335,386 B2 * | 12/2012 | Saito | ............................. | 382/233 |
| 2003/0194138 A1 * | 10/2003 | Osawa et al. | ................. | 382/233 |
| 2009/0028454 A1 | 1/2009 | Yokose | | |
| 2009/0060039 A1 * | 3/2009 | Tanaka et al. | ............ | 375/240.13 |

(Continued)

FOREIGN PATENT DOCUMENTS

| | | |
|---|---|---|
| JP | A-04-048873 | 2/1992 |
| JP | A-2009-27580 | 2/2009 |
| JP | A-2009-27664 | 2/2009 |

*Primary Examiner* — Vu Le
*Assistant Examiner* — Alexander J Lesnick
(74) *Attorney, Agent, or Firm* — Oliff & Berridge, PLC

(57) ABSTRACT

Provided is an image processing apparatus including a receiving unit that receives a point sequence image, a point-plane conversion unit that performs a point-plane conversion processing for the image received by the receiving unit, plural lossy encoding units that perform a lossy encoding processing for the point-plane conversion image by using the point-plane conversion unit, and a control unit that performs control such that transmission of the image to the lossy encoding unit from the point-plane conversion unit is controlled to synchronize lossy encoding processings of the plural lossy encoding units, and each lossy encoding unit changes processing variables used in the encoding processing based on a code amount of the processing result of the lossy encoding unit.

19 Claims, 18 Drawing Sheets

(56) References Cited

U.S. PATENT DOCUMENTS

| | | | |
|---|---|---|---|
| 2009/0074052 A1* | 3/2009 | Fukuhara et al. | 375/240.01 |
| 2009/0225825 A1* | 9/2009 | Saito et al. | 375/240.01 |
| 2009/0279800 A1* | 11/2009 | Uetani et al. | 382/238 |
| 2010/0135381 A1* | 6/2010 | Hamamoto et al. | 375/240.01 |
| 2010/0266047 A1* | 10/2010 | Takahashi et al. | 375/240.22 |
| 2011/0013831 A1* | 1/2011 | Yokose | 382/166 |
| 2011/0019930 A1* | 1/2011 | Koyabu et al. | 382/238 |
| 2011/0149110 A1* | 6/2011 | Sugiyama | 348/223.1 |
| 2011/0176606 A1* | 7/2011 | Fuchie | 375/240.05 |
| 2011/0200102 A1* | 8/2011 | Saitoh et al. | 375/240.03 |
| 2011/0305383 A1* | 12/2011 | Lee et al. | 382/154 |
| 2012/0275697 A1* | 11/2012 | McDowell et al. | 382/166 |
| 2012/0328192 A1* | 12/2012 | Fukuhara | 382/166 |

* cited by examiner

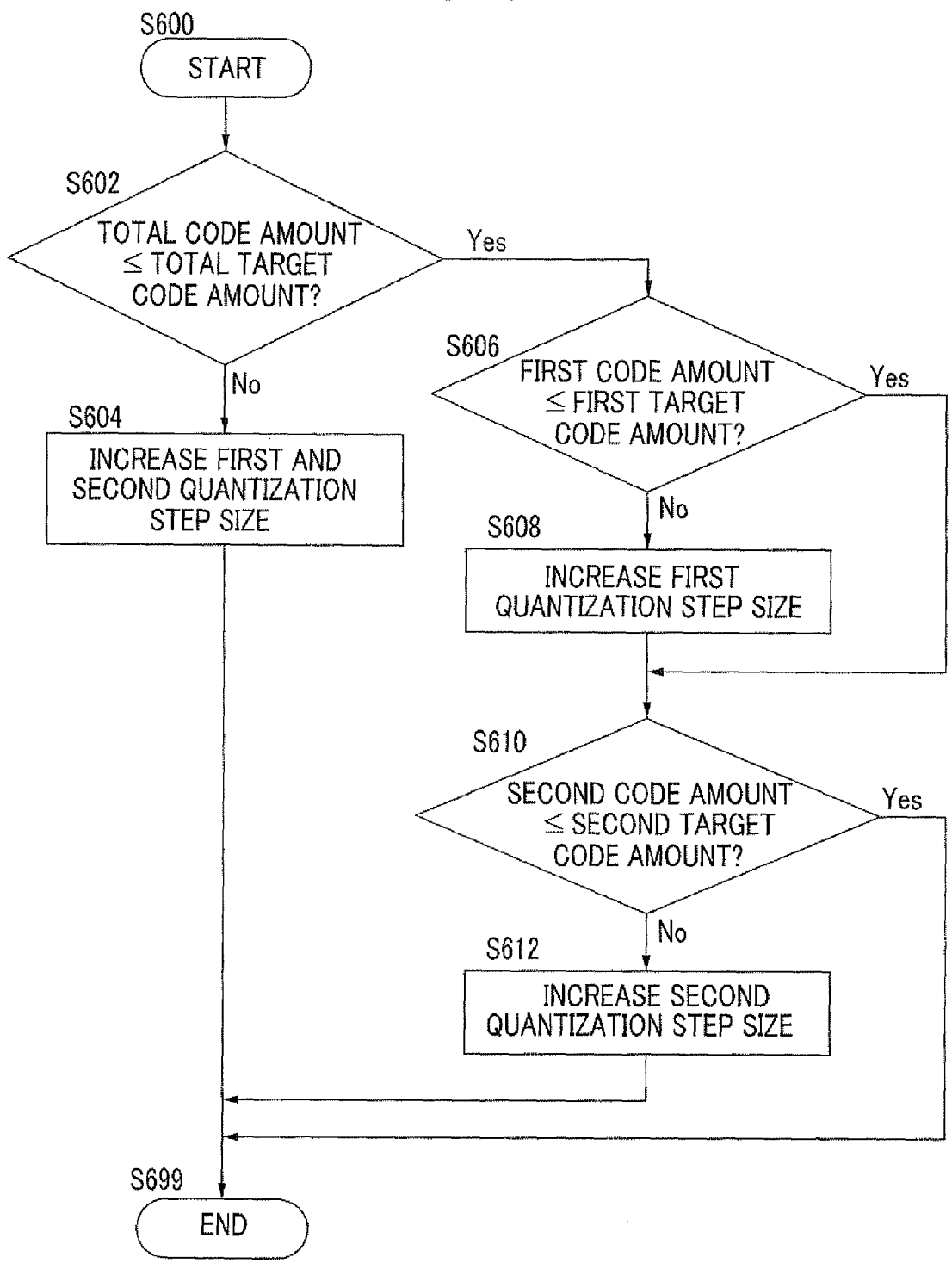

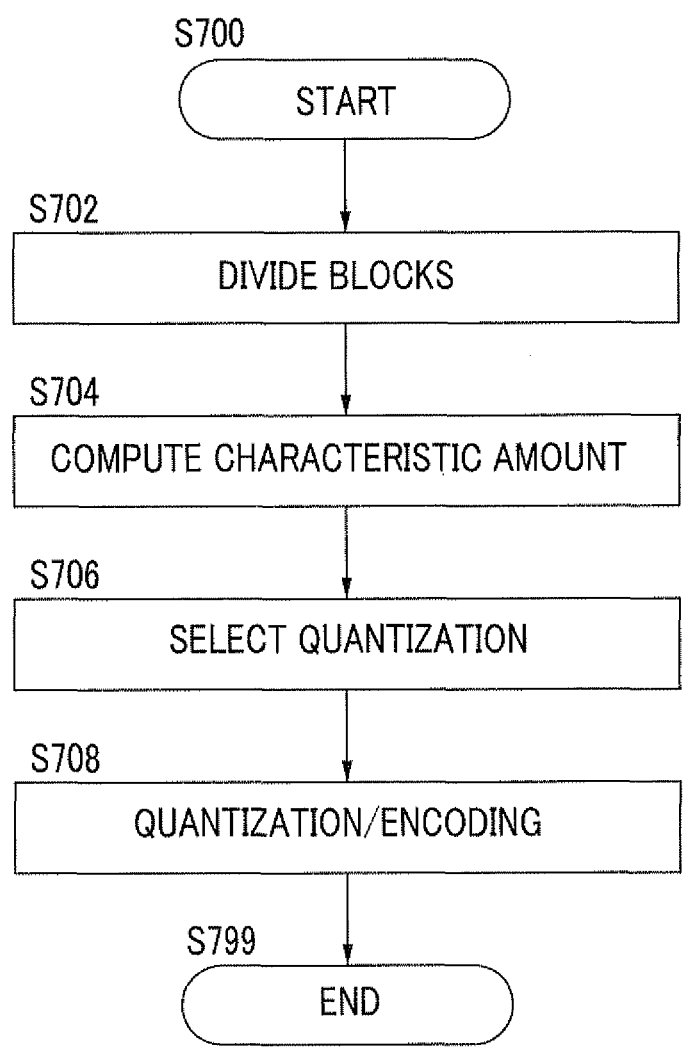

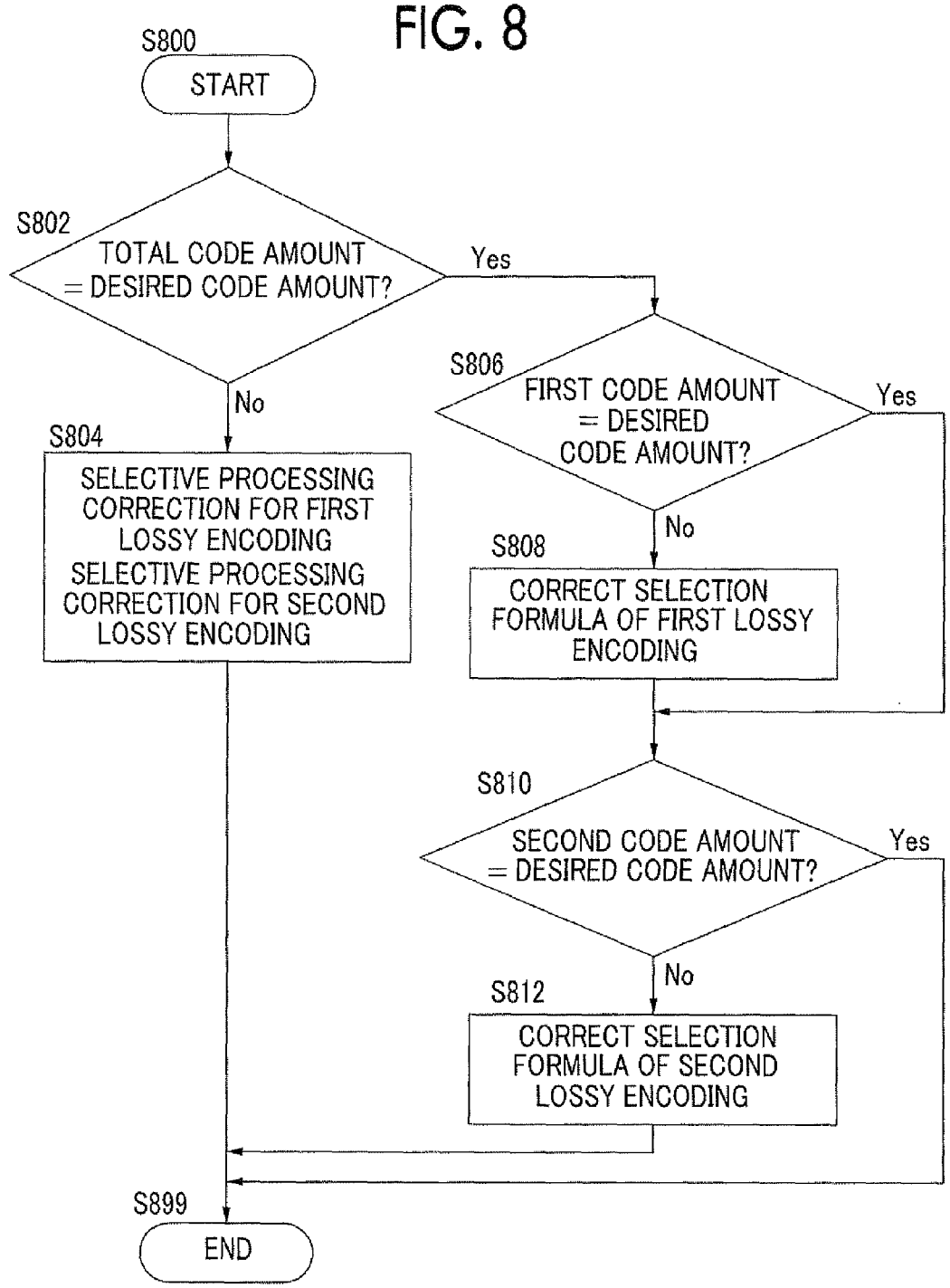

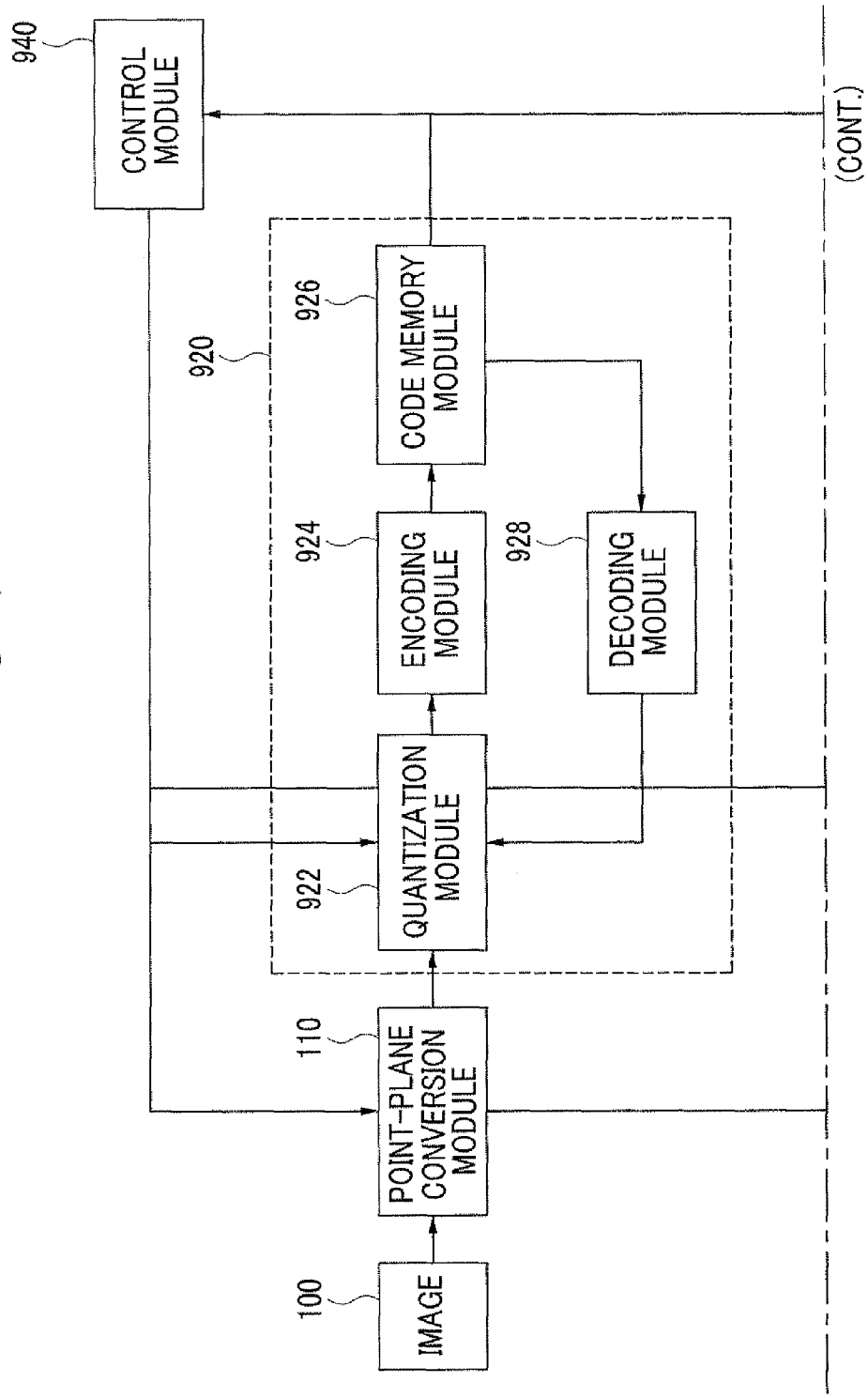

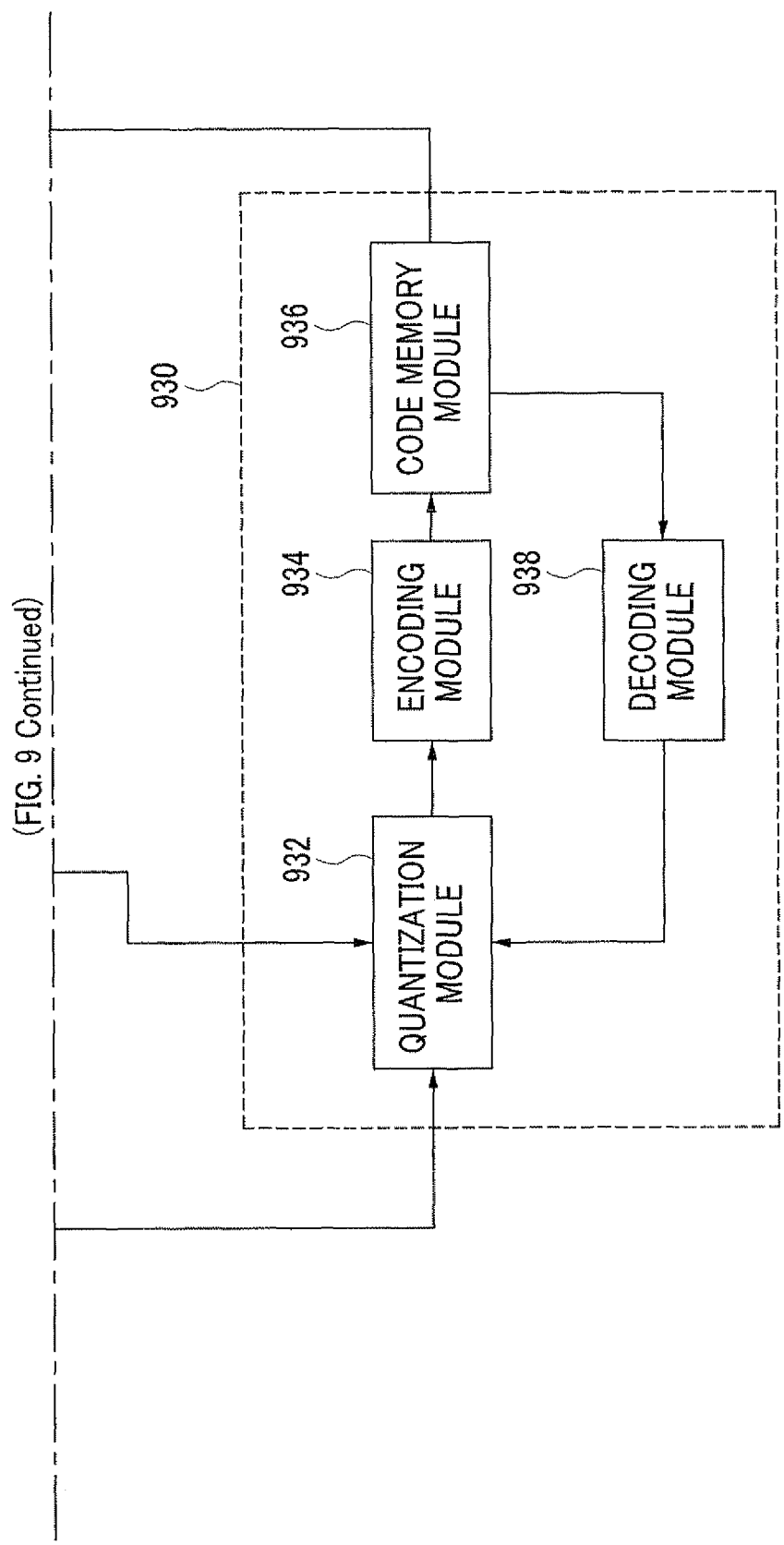

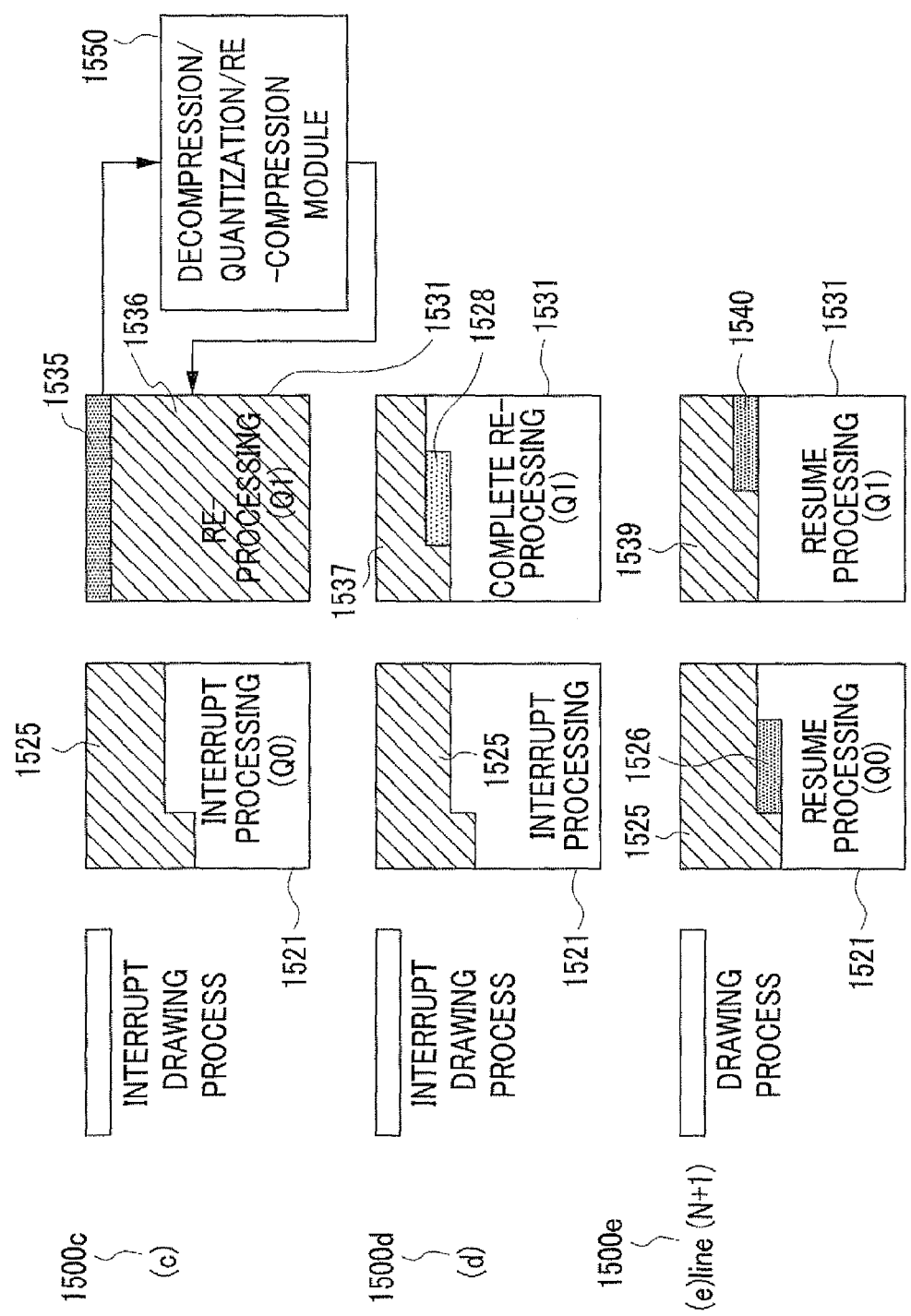

IMAGE PROCESSING APPARATUS, IMAGE PROCESSING METHOD, AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2011-192374 filed Sep. 5, 2011.

BACKGROUND

Technical Field

The present invention relates to an image processing apparatus, an image processing method, and a non-transitory computer readable medium storing an image processing program.

SUMMARY

According to an aspect of the invention, there is provided an image processing apparatus including: a receiving unit that receives a point sequence image; a point-plane conversion unit that performs a point-plane conversion processing for the image received by the receiving unit; plural lossy encoding units that perform a lossy encoding processing for the point-plane conversion image by using the point-plane conversion unit; and a control unit that performs control such that transmission of the image to the lossy encoding unit from the point-plane conversion unit is controlled to synchronize lossy encoding processings of plural lossy encoding units, and each lossy encoding unit changes processing variables used in the encoding processing based on a code amount of the processing result of the lossy encoding unit.

BRIEF DESCRIPTION OF THE DRAWINGS

Exemplary embodiments of the present invention will be described in detail based on the following figures, wherein:

FIG. 6 is a flowchart illustrating an exemplary control processing according to the first exemplary embodiment;

FIG. 7 is a flowchart illustrating an exemplary lossy encoding processing according to the first exemplary embodiment;

FIG. 8 is a flowchart illustrating an exemplary control processing according to the first exemplary embodiment;

FIG. 9 is a conceptual modular configuration diagram illustrating an exemplary configuration according to a second exemplary embodiment;

DETAILED DESCRIPTION

Hereinafter, various exemplary embodiments of the invention will be described in detail with reference to the accompanying drawings.

First Exemplary Embodiment

Figure 1:
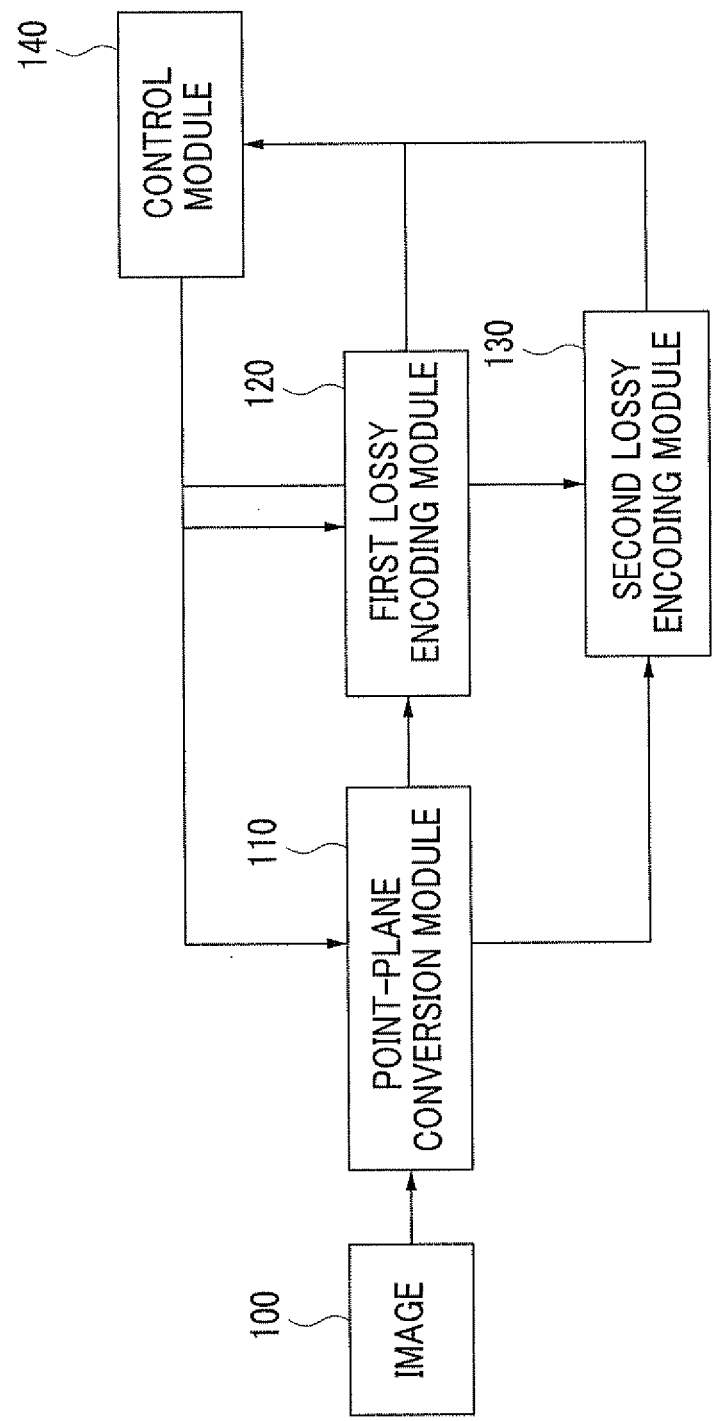
FIG. 1 is a conceptual modular configuration diagram illustrating an exemplary configuration according to a first exemplary embodiment.

FIG. 1 is a conceptual modular configuration diagram illustrating an exemplary configuration according to a first exemplary embodiment.

In the following description, the "module" in general indicates a component of software (computer "." program), hardware, or the like that may be logically separated. Therefore, the module according to an exemplary embodiment of the invention refers to the module as both of a computer program and a hardware configuration. Therefore, the exemplary embodiments of the invention include a computer program, a system, and a method (such as a program for executing each sequence in a computer, a program for causing a computer to act as each means, and a program for executing each function in a computer) serving as such module. However, for convenience of explanation, although a phrase "to store," "to be stored," or equivalents thereof are used, such a statement means "stored in the storage device" or "controlled to be stored in the storage device" in the case of the computer program. In addition, although each module may correspond one to one to each function, in terms of the mounting, a single program may include a single module, a single program may include plural modules, and, conversely, a single module may include plural programs. In addition, plural modules may be executed in a single computer, or a single module may be executed in plural computers in a distributed or paralleled computer environment. Moreover, another module may be included in a single module. Hereinafter, the phrase "connection" maybe used for a logical connection (exchange of data, instruction, a reference relationship between data, or the like) in addition to a physical connection. The word "predetermined" means "determined in advance prior to a target processing" and also includes a meaning of "determined" depending the condition or state at that time or until that time if the target processing has not been terminated even after the processing according to an exemplary embodiment of the invention is initiated as well as before the processing according to an exemplary embodiment of the invention is performed. In addition, a description "it determines whether or not A, and, if it is determined A, B is performed" means that "If A, B". However, a case where determination whether A or not is not necessary is excluded.

The system or device may be embodied as plural computers, hardware units, and devices connected using a communication unit such as a network (including one-to-one communication connection) or may be embodied as a single computer, a single hardware unit, a single device, or the like. The words "device" and "system" are used as synonymous terms. Naturally, "system" does not include an artificial social "structure" (social system).

In every processing performed by the module or whenever each module performs the processing, target information is read from the storage device, the processing is performed, and then, the processing result is written to the storage device. Therefore, description will be omitted about information which is read from the storage device prior to the processing and which is written to the storage device after the processing. In addition, the storage device may include a hard disk, a random access memory (RAM), an external storage medium, a storage device connected through a communication line, a register in the central processing unit (CPU), and the like.

The image processing apparatus according to the first exemplary embodiment performs lossy encoding for the image and, as shown in the example of FIG. 1, includes a point-plane conversion module 110, a first lossy encoding module 120, a second lossy encoding module 130, and a control module 140.

The point-plane conversion module 110 is connected to the first lossy encoding module 120, the second lossy encoding module 130, and the control module 140. The point-plane conversion module 110 receives the point sequence image 100 and performs the point-plane conversion processing for the image 100.

"Receiving an image" includes, for example, reading the image from a scanner, a camera, or the like, receiving the image from an external device through a communication line such as a facsimile, and reading the image stored on the hard disk (connected via a network, in addition to built into the computer, or the like) or the like. The image may be a binary image or a multivalued image (including color image). The received image may be single or plural. The image content may include a document used in business, a promotional pamphlet for advertising, and the like.

The point-plane conversion process refers to a process of converting a point sequence image into a plane sequence image.

A point sequence (also, referred to as a point order) image refers to an image where each pixel includes overall information (for example, overall information of color components) of that pixel.

A plane sequence (also, referred to as a plane order) image refers to a single image is configured of planes defined for each type (for example, color components) of information of the pixels. For example, if a pixel includes three types of information, the image includes three types of planes regarding each type of information. For example, if three types are R, G, and B of the color component, the planes include a plane of only the R component, a plane of only the G component, and a plane of only the B component. Meanwhile, the point sequence image is configured of a single plane containing R component information, G component information, and component information in a single pixel.

The point sequence or the plane sequence may be defined using the number of scannings for the processing (such as read processing, image processing, and writing processing). That is, the point sequence may be processed in a single scanning, and the plane sequence is necessarily scanned as many as the number of types of information to perform the processing.

The point-plane conversion processing using the point-plane conversion module 110 may be a processing that the point sequence image is converted into the plane image for each color component. That is, the point sequence image is divided on a color basis and transmitted to the lossy encoding module corresponding to each color. This transmission is performed, for example, for each part of image such as a line and a band, and the operation timing is controlled by the control module 140 as described below.

The first lossy encoding module 120 and the second lossy encoding module 130 are connected to the point-plane conversion module 110 and the control module 140. The first lossy encoding module 120 performs a lossy encoding processing for the point-plane converted image (plane sequence image) using the point-plane conversion module 110. In addition, although the number of the lossy encoding modules is set to two in the example of FIG. 1, it may be three or more. Plural lossy encoding modules may be lossy encoding modules corresponding to each color component. Specifically, appropriate processing variables may be used for the color component.

The lossy compression performed by the first and second lossy encoding modules 120 and 130 includes, for example, JPEG, MPEG, or the like. Although, the first and second lossy encoding modules 120 and 130 are independent from each other, they are controlled by the control module 140.

The control module 140 is connected to the point-plane conversion module 110, the first lossy encoding module 120, and the second lossy encoding module 130. The control module 140 controls the image transmission to the first lossy encoding module 120 and the second lossy encoding module 130 from the point-plane conversion module 110, synchronizes the lossy encoding processing of the first and second lossy encoding modules 120 and 130, and controls the transmission to the next processing device (such as a printer) from the first and second lossy encoding module 120 and 130.

The control module 140 controls the processing variable (also, called an encoding parameter, a quantization parameter, and a quantization step size, and hereinafter, referred to as a quantization step size) used in the encoding processing for the first and second lossy encoding modules 120 and 130 based on the code amount of the processing result of the first and second lossy encoding modules 120 and 130. For example, the target code amount and the created code amounts of each lossy encoding module are compared. If the created code amount is larger than the target code amount, the quantization step size is controlled more sparsely in comparison with the previous one.

Naturally, even when there are three or more lossy encoding modules, they are controlled similarly to that of the first and second lossy encoding modules 120 and 130 (similarly applied in the following description).

The control module 140 may perform control to change the quantization step size used in the lossy encoding module (such as first and second lossy encoding modules 120 and 130) based on the code amount for each color component, a sum of the code amounts for each color component, or both of them.

Figure 2:
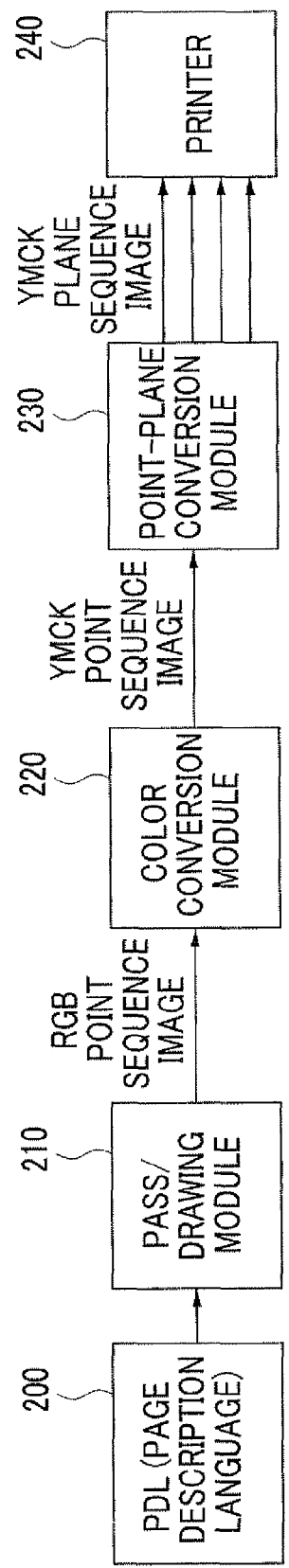
FIG. 2 is an explanatory diagram illustrating an exemplary system configuration according to the present exemplary embodiment.

FIG. 2 is an explanatory diagram illustrating an exemplary system configuration according to the present exemplary embodiment (exemplary embodiments described herein including the second embodiment and the like, and similarly applied in the following description). The system includes a pass/drawing module 210, a color conversion module 220, a point-plane conversion module 230, and a printer 240. The pass/drawing module 210, the color conversion module 220, and the point-plane conversion module 230 are called a controller part of the printer 240.

The pass/drawing module 210 is connected to the color conversion module 220. The pass/drawing module 210 receives the print target data of the page description language (PDL) 200, analyzes the print command in the PDL 200, and performs the drawing processing based on the analysis result. This processing results in the point sequence image composed of RGB color space.

The color conversion module 220 is connected to the pass/drawing module 210 and the point-plane conversion module 230. The color conversion module 220 converts the RGB point sequence image into the YMCK color space which is a color space that may be handled by the printer 240. This process results in the point sequence image composed of YMCK color space.

The point-plane conversion module 230 is connected to the color conversion module 220 and the printer 240. The point-plane conversion module 230 converts the YMCK point sequence image into the YMCK plane sequence image. That is, the image is created for each of four color components since the printer 240 repeats print for each color component (color plate). Each color image is sequentially transmitted to the printer 240 in accordance with the printing operation of the printer 240.

The printer 240 is connected to the point-plane conversion module 230. The printer 240 prints the YMCK point sequence image on the sheet.

That is, the processing of the pass/drawing module 210 and the color conversion module 220 is performed for the point sequence image. In order to perform the plane sequence output in the printer 240, the point-plane conversion module 230 performs the point-plane conversion.

In addition, the printer 240 may employ an YMCK system, an RGB system (the printer 240 uses light exposure), or a multi-color separation system (such as an ink jet printer 240).

In such a system, a code amount controlled compression is applied considering relationship between a range and a capacity of the output to the printer 240. For this reason, the present exemplary embodiment may be incorporated into the point-plane conversion module 230. In this case, in the example of FIG. 1, the third and fourth lossy encoding modules are employed in addition to the first and second lossy encoding modules 120 and 130, and the output of each lossy encoding module becomes an Y, M, C, and K plane images.

Figure 3:
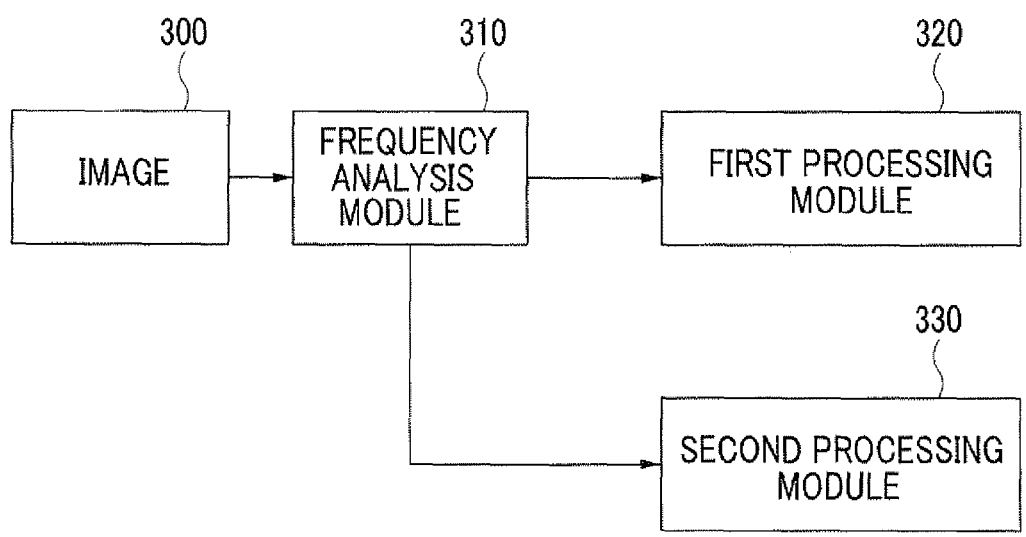
FIG. 3 is an explanatory diagram illustrating an exemplary system configuration according to the present exemplary embodiment.

In addition to the exemplary system of FIG. 2, the system may analyze a frequency of the image and perform a specific processing for each frequency. FIG. 3 is an explanatory diagram illustrating an exemplary system configuration according to the present exemplary embodiment. The system includes a frequency analysis module 310, a first processing module 320, and a second processing module 330.

The frequency analysis module 310 is connected to the first and second processing modules 320 and 330. The frequency analysis module 310 receives the image 300, analyzes the frequency, and allocates the frequency to the first and second processing modules 320 and 330 in order to perform an appropriate processing for each frequency.

The first processing module 320 and the second processing module 330 are connected to the frequency analysis module 310. Each of the first and second processing modules 320 and 330 performs a processing suitable for that frequency.

In such a system, it is preferable to create plural codes for a single image. For this reason, the exemplary embodiment maybe included in the frequency analysis module 310. In this case, the first and second lossy encoding modules 120 and 130 are not divided for each color component but divided for each frequency.

Figure 4:
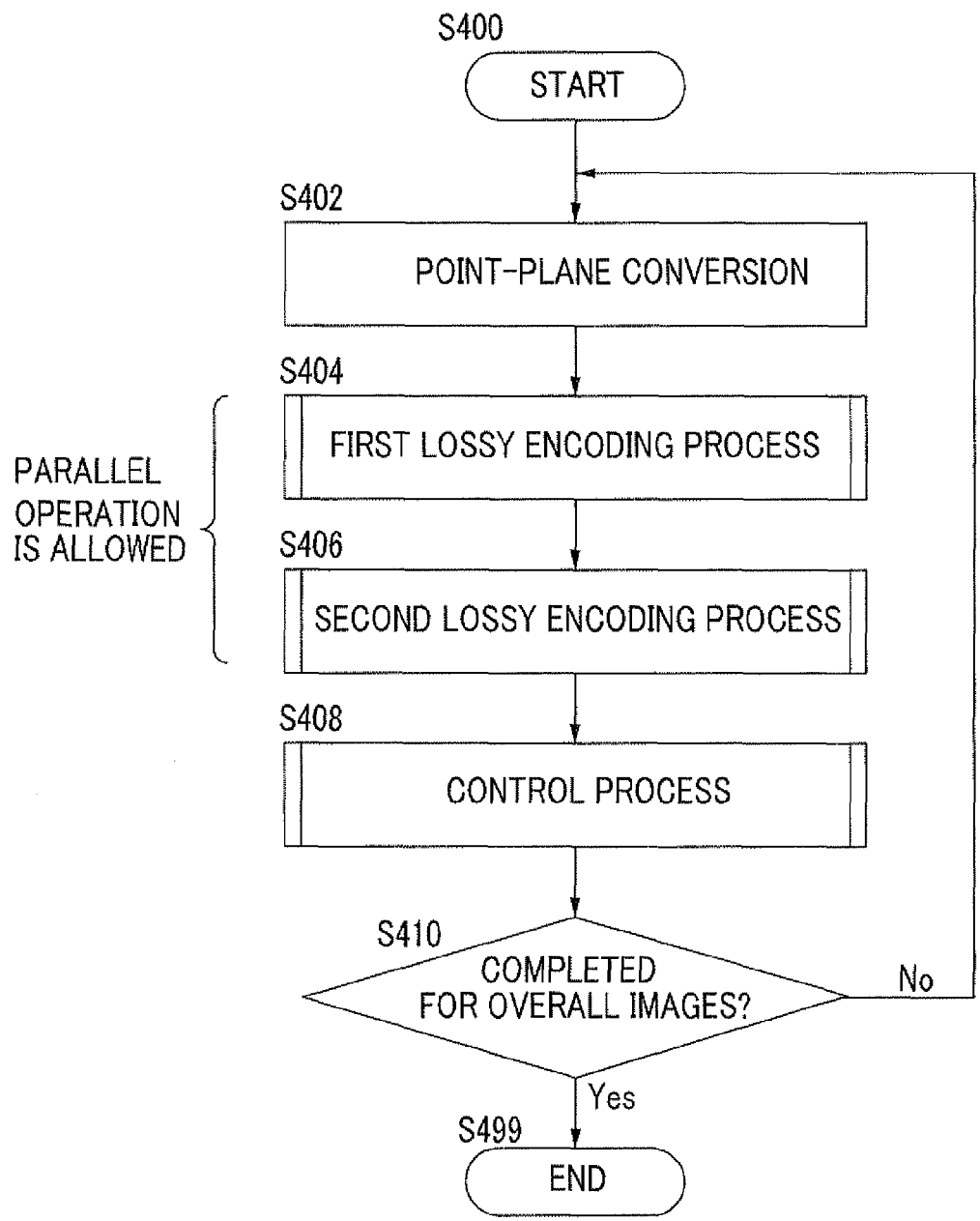
FIG. 4 is a flowchart illustrating an exemplary processing according to the first exemplary embodiment.

FIG. 4 is a flowchart illustrating an exemplary processing according to the first exemplary embodiment. For the purpose of convenience, although description will be made for a case where the processing of the first lossy encoding module 120 and the processing of the second lossy encoding module 130 are operated in series, the processing may be performed in a reversed order, or may be operated in parallel.

In step S402, the point-plane conversion module 110 performs the point-plane conversion.

In step S404, the first lossy encoding module 120 performs the first lossy encoding processing. Description thereof will be made below with reference to the flowcharts in FIGS. 5 and 7.

In step S406, the second lossy encoding module 130 performs the second lossy encoding processing. Description thereof will be made below with reference to the flowcharts in FIGS. 5 and 7.

In step S408, the control module 140 performs the control process. Description thereof will be made below with reference to the flowcharts in FIGS. 6 and 8.

In step S410, the control module 140 determines whether or not the processing is completed for all images. If the processing is completed for all images, the process is terminated (step S499). Otherwise, the processing from the step S402 is carried out.

Figure 5:
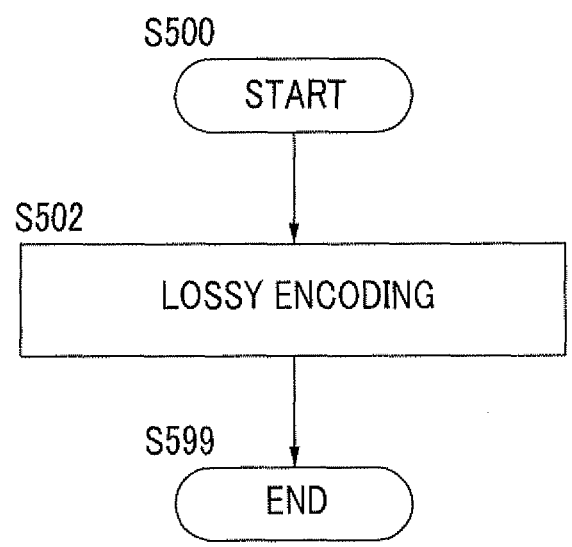
FIG. 5 is a flowchart illustrating an exemplary lossy encoding processing according to the first exemplary embodiment.

FIG. 5 is a flowchart illustrating an exemplary lossy encoding processing according to the first exemplary embodiment (first and second lossy encoding modules 120 and 130).

In step S502, the lossy encoding processing is performed. For example, the lossy encoding processing, such as JPEG, is performed for each color component of the image.

FIG. 6 is a flowchart illustrating an exemplary control processing according to the first exemplary embodiment (control module 140).

In step S602, it determines whether or not total code amount≤total target code amount. If it is determined that total code amount≤total target code amount, the process advances to step S606. Otherwise, the process advances to step S604.

In step S604, the first and second quantization step sizes are increased.

In step S606, it is determined whether or not first code amount≤first target code amount. If it is determined that first code amount≤first target code amount, the process advances to step S610. Otherwise, the process advances to step S608.

In step S608, the first quantization step size is increased.

In step S610, it is determined whether or not second code amount≤second target code amount. If it is determined that second code amount≤second target code amount, the process is terminated (step S699). Otherwise, the process advances to step S612.

In step S612, the second quantization step size is increased.

In the control process of the control module 140, for example, the quantization step sizes for each color may be monitored, and each of the quantization step sizes may be controlled in conjunction with each other so as not to generate a significant difference therebetween (that is, regardless of the code amount). The significant difference between the quantization step sizes is detected if the difference between the quantization step sizes is greater than a predetermined value by comparing the difference of the quantization step sizes with the predetermined value. As a controlling method in conjunction with each quantization step size, for example, the difference between respective quantization step sizes may be set to be equal to or smaller than a predetermined value.

FIG. 7 is a flowchart illustrating an exemplary lossy encoding processing according to the first exemplary embodiment (first and second lossy encoding modules 120 and 130) as a processing example different from that of FIG. 5

In step S702, the image is divided into blocks.

In step S704, the characteristic amount is calculated for each block.

In step S706, a quantization is selected.

In step S708, a processing of the quantization encode is performed.

FIG. 8 is a flowchart illustrating an exemplary control processing according to the first exemplary embodiment (control module 140).

In step S802, it is determined whether or not a total code amount is a desired code amount. If the total code amount is equal to a desired code amount, the process advances to step S806. Otherwise, the process advances to step S804.

In step S804, a selection processing correction of the first lossy encoding and a selection processing correction of the second lossy encoding are performed.

In step S806, it is determined whether or not the first code amount is equal to the desired code amount. If the first code amount is equal to the desired code amount, the process advances to step S810. Otherwise, the process advances to step S808.

In step S808, the selection formula correction of the first lossy encoding is performed.

In step S810, it is determined whether or not the second code amount is equal to a desired code amount. If the second code amount is equal to the desired code amount, the process is terminated (step S899). Otherwise, the process advances to step S812.

In step S812, the selection formula correction of the second lossy encoding is performed.

In the exemplary processing of FIGS. 7 and 8, the lossy encoding processing calculates the characteristic amount for each block. By the selection processing using the characteristic amount, the selection of the quantization method is accomplished. In this case, it is possible to control the code amount by the selection processing correction.

An example of such selection processing correction will be described. In the block where the quantization method QL is applied, it is assumed that an average code amount CL may be expected. In the selection processing described above, it is determined which quantization method QL is used to process the block based on a predetermined characteristic amount. In this case, code amount may be estimated as follows:

(total code amount estimation)=$\Sigma_L$ {(the number of blocks processed by $Q_L$)×$C_L$} (1)

Conversely, if the left side of formula (1) is set to a predetermined code amount, it is possible to calculate the number of blocks to be processed in the $Q_L$. That is, the predetermined code amount may be obtained by correcting the selection processing so as to obtain the number of blocks.

For example, it is assumed that there are two quantization methods of $Q_1$ and $Q_2$ so that $Q_1$ is selected if the characteristic amount is greater than a threshold T, and $Q_2$ is selected otherwise. In addition, the average code amounts expected for respective quantizations are set to $C_1$ and $C_2$, where $C_1 > C_2$. In this case, if a small T is selected, the number of blocks which selects $Q_1$ increases, and thus, the code amount also increases. If a large T is selected, the code amount decreases. In this manner, it is possible to adjust the code amount by correcting the threshold T.

Next, if the threshold T is corrected in this example, even the images having the same characteristic amount may be processed to have different quantization results such that Q1 is used before the correction, and Q2 is used after the correction. In terms of the image quality, it may be undesirable because the image quality is changed in the middle of the image. In this case, the selection processing may be corrected for the entire image using a configuration (the second exemplary embodiment) such as re-encoding described below.

Second Exemplary Embodiment

FIG. 9 is a conceptual modular configuration diagram illustrating an exemplary configuration according to the second exemplary embodiment. The image processing apparatus according to the second exemplary embodiment performs the lossy encoding for the image and, as shown in the example of FIG. 9, includes a point-plane conversion module 110, a first lossy encoding module 920, a second lossy encoding module 930, and a control module 940. From the viewpoint of the image quality, the change of the quantization step size during the encoding may not be desirable. In such a case, according to the second exemplary embodiment, re-encoding is performed from the beginning of the image if the code amount is greater than a predetermined amount.

In addition, like reference numerals denote like elements as in the aforementioned exemplary embodiment, and description thereof will not be repeated (similarly applied in the following description).

The first lossy encoding module 920 includes a quantization module 922, an encoding module 924, a code memory module 926, and a decoding module 928. The second lossy encoding module 930 includes a quantization module 932, an encoding module 934, a code memory module 936, and a decoding module 938. Hereinafter, a configuration of the first lossy encoding module 920 will be described since the configuration of the second lossy encoding module 930 is similar to that of the first lossy encoding module 920.

The point-plane conversion module 110 is connected to a quantization module 922, a quantization module 932, and a control module 940.

The quantization module 922 is connected to the point-plane conversion module 110, the encoding module 924, the decoding module 928, and the control module 940. The quantization module 922 performs a quantization using a quantization step size given by the control module 940. In addition, an efficient compression processing may be performed in a front or rear stage of the quantization module 922, such as frequency conversion, predictive conversion, and the like.

The encoding module 924 is connected to the quantization module 922 and the code memory module 926. The encoding module 924 encodes the image quantized by the quantization module 922.

The code memory module 926 is connected to the encoding module 924, the decoding module 928, and the control module 940. The code memory module 926 memorizes the code which is a result of lossy encoding processing by the encoding module 924.

The quantization module 922 and the encoding module 924 perform lossy encoding processing to the target image decoded by the decoding module 928 by the control of the control module 940.

The decoding module 928 is connected to the quantization module 922 and the code memory module 926. The decoding module 928 decodes the code stored in the code memory module 926 and transmits the code to the quantization module 922.

The control module 940 is connected to the point-plane conversion module 110, the quantization module 922, the code memory module 926, the quantization module 932, and the code memory module 936.

In the second exemplary embodiment, an exemplary operation in which control is performed only for the code amounts of each color will be described in the following flowchart. Since the overall operation of the second exemplary embodiment is similar to that of FIG. 4, description thereof will not be repeated. In addition, although it is assumed that the first and second re-encoding processes may be operated in series in the control process of FIG. 12 for convenience purposes, the first and second re-encoding processes may be operated in a reverse order, or may be operated in parallel. If the first and second re-encoding processes are operated in parallel, the control processing is terminated at the end of both the re-encoding processes.

Figure 10:
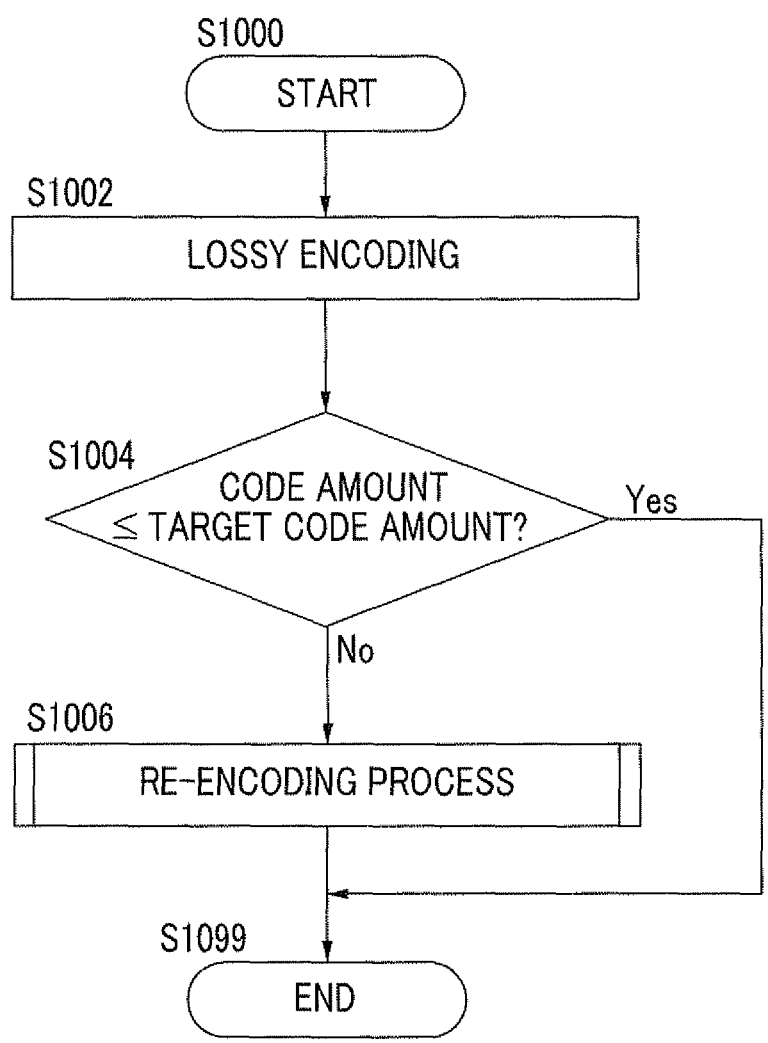
FIG. 10 is a flowchart illustrating an exemplary lossy encoding processing according to the second exemplary embodiment.

FIG. 10 is a flowchart illustrating an exemplary lossy encoding processing according to the second exemplary embodiment (first and second lossy encoding modules 920 and 930).

In step S1002, the lossy encoding is performed.

In step S1004, it is determined whether or not code amount≤target code amount. If it is determined that code amount≤target code amount, the process is terminated (step S1099). Otherwise, the process advances to step S1006.

In step S1006, the re-encoding process is performed. Description thereof will be made below with reference to the flowchart of FIG. 11.

Figure 11:
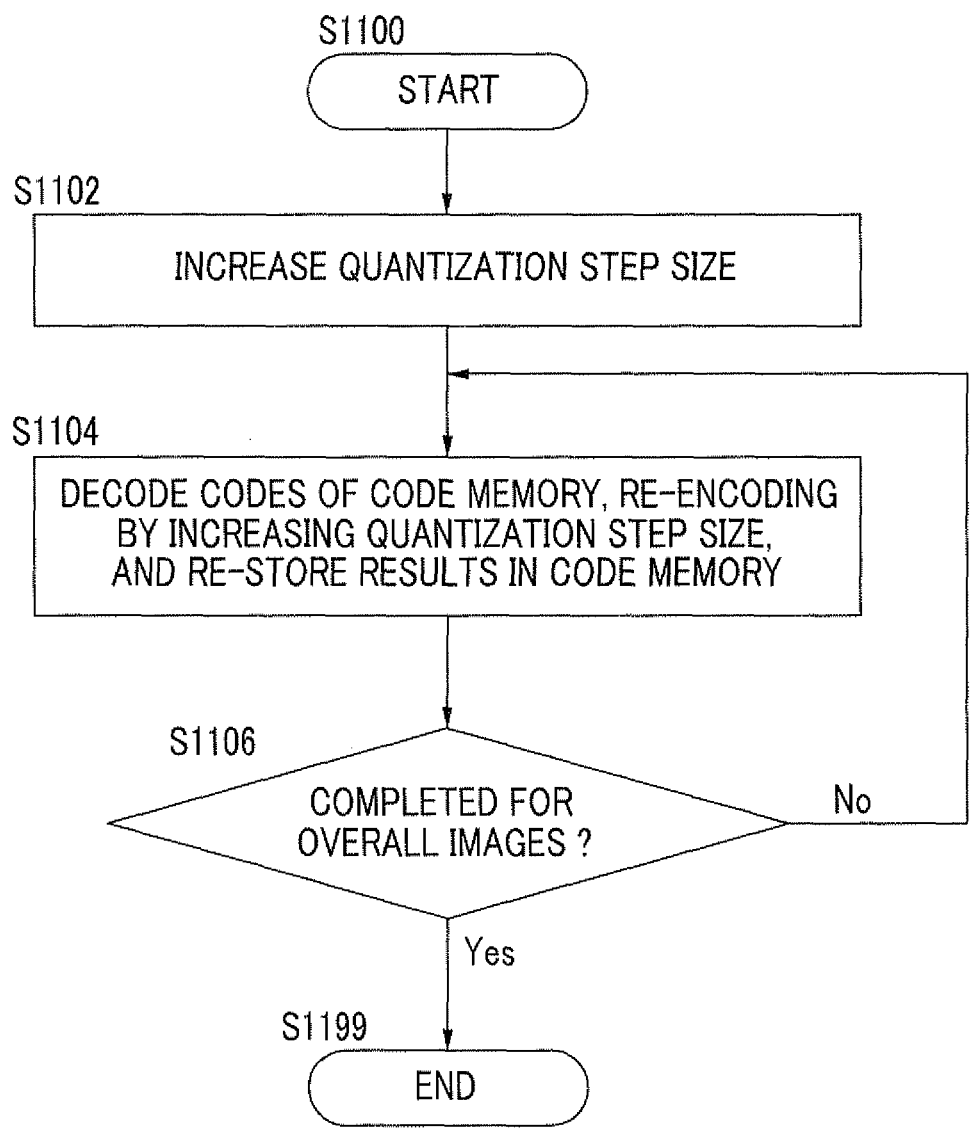
FIG. 11 is a flowchart illustrating an exemplary re-encoding process according to the second exemplary embodiment.

FIG. 11 is a flowchart illustrating an exemplary re-encoding processing according to the second exemplary embodiment (first and second lossy encoding modules 920 and 930). In addition, when the re-encoding processing is performed, the control module 940 stops other processings. If the re-encoding processing is terminated, the stopped processings are resumed.

In step S1102, the quantization step size is increased.

In step S1104, the code of the code memory is decoded, is re-encoded with an increased quantization step size, and is stored in the code memory again.

In step S1106, it determines whether or not the processing is completed for all images. If it is determined that the processing is completed for all images, the process is terminated (step S1199). Otherwise, the processing from the step S1104 is performed.

Figure 12:
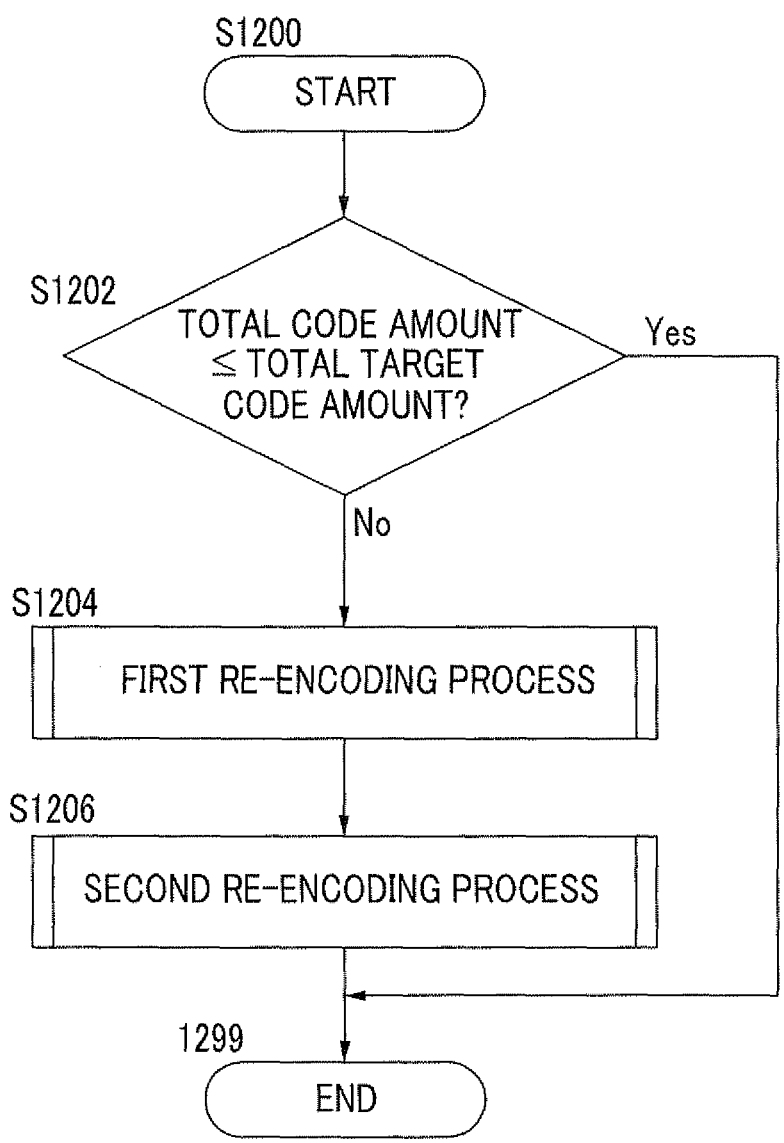
FIG. 12 is a flowchart illustrating an exemplary control processing according to the second exemplary embodiment.

FIG. 12 is a flowchart illustrating an exemplary control processing according to the second exemplary embodiment (control module 940).

In step S1202, it is determined whether or not total code amount≤total target code amount. If it is determined that the total code amount≤total target code amount, the process is terminated (step S1299). Otherwise, the process advances to step S1204.

In step S1204, the first re-encoding process is performed.

In step S1206, the second re-encoding process is performed.

In addition, the re-encoding process has a long processing time in general in order to perform the re-processing from the beginning of the image. When the re-encoding for only few colors is performed, there is significant difference in a latency time between colors. However, since the control module 940 controls synchronization in the second exemplary embodiment, the processing is performed without a page memory.

In the control using the control module 940 according to the second exemplary embodiment, considering a fact that the re-encoding takes time, for example, if the re-encoding process is performed for an image having any color component, the image having other color components for which the re-encoding process is likely necessary in the future may be controlled to be re-encoded in advance. In this case, since the re-encoding process may be performed in parallel, it is possible to eliminate the overhead caused by the re-encoding. The "image having other color components for which the re-encoding process is likely to be necessary in the future" may be determined that the re-encoding process is necessary in the future if the code amount obtained so far is greater than a predetermined amount by comparing the code amount obtained so far with a predetermined amount.

Figure 15:
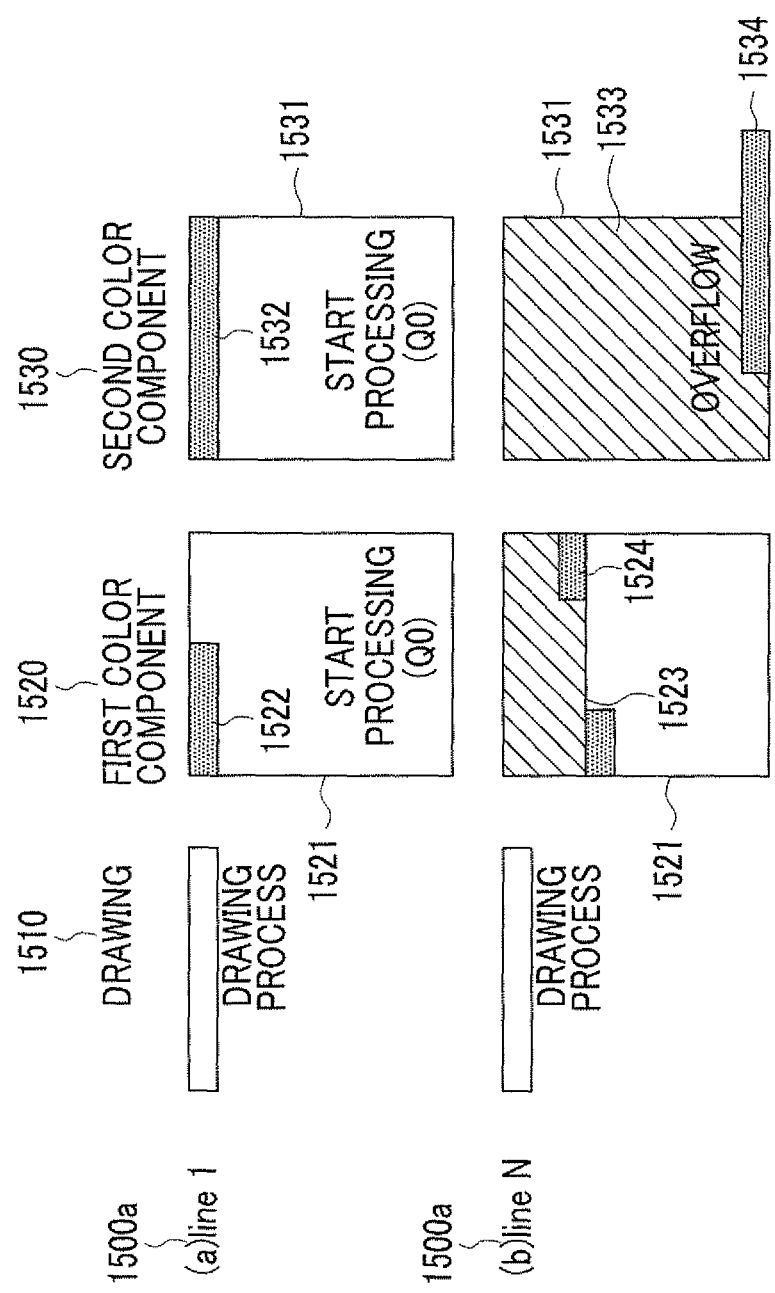
FIG. 15 is an explanatory diagram illustrating an exemplary re-encoding process.

The control order of the processing including the recompression process according to the second exemplary embodiment will be described with reference to FIG. 15 which illustrates the data flow mainly. In FIG. 15, the process advances from the top to the bottom, the code memory 1521 corresponds to the code memory module 926 illustrated in FIG. 9, and the code memory 1531 corresponds to the code memory module 936 illustrated in FIG. 9. In addition, the drawing process refers to the process using the pass/drawing module 210 illustrated in FIG. 2.

First, in the first line drawing process 1500a, the drawing state 1510 is a "drawing processing," the code memory 1521 of the first color component state 1520 has a created code 1522, and the code memory 1531 of the second color component state 1530 has a created code 1532. That is, after the line1 is drawn, a color conversion processing of the color conversion module 220 and a point-plane conversion processing of the point-plane conversion module 230 are performed, each of the first and second color components is compressed by the first lossy encoding module 920 (quantization module 922 and encoding module 924) and the second lossy encoding module 930 (quantization module 932 and encoding module 934) and stored in the code memory modules 926 and 936. All of the quantization parameters at this time are set to Q0.

Subsequently, the processing is performed in the order of lines 2, 3, . . . , N.

In the drawing process 1500b for the (N)th line, the drawing state 1510 is a "drawing processing," the code memory 1521 of the first color component state 1520 has the existing code 1523 and the created code 1524, and the code memory 1531 of the second color component state 1530 has the existing code 1533 and the created code 1534 so that the created code 1534 is not received by the code memory 1531 and generates an overflow. That is, line N is drawn, and at this time, the second color component code is not received by the memory and generates an overflow.

In the drawing process interruption 1500c, the drawing state 1510 is a "drawing process interruption," the code memory 1521 of the first color component state 1520 has the existing code 1525, and the code memory 1531 of the second color component state 1530 has the created code 1535 and the existing code 1536. That is, the drawing of the line next to the line N and the processing of the first color component are interrupted, and the re-processing (processing of the decompression/quantization/recompression module 1550) of the second color component starts. Specifically, returning to the beginning of the image, the code of the second color component is decompressed, quantized, recompressed, and then, stored in the memory again. That is, the code in the code memory 1531 is processed using a decompression/quantization/recompression module 1550 (in the example of FIG. 9, using a decoding module 928, a quantization module 922, and an encoding module 924) from the beginning and stored in the code memory 1531 again. The quantization step size at this moment is set to Q1 so that control is performed to obtain a stronger quantization in comparison with Q0 (the quantization step size of Q1 is greater than the quantization step size of Q0). As a result, the re-stored code becomes smaller than the read code. Therefore, if the starting positions of reading and writing are matched, the writing destination does not surpass the reading destination. That is, the recompressed code may be rewritten to the code memory module 926.

In the drawing process interruption 1500d, the drawing state 1510 is a "drawing process interruption," the code memory 1521 of the first color component state 1520 has the existing code 1525, and the code memory 1531 of the second color component state 1530 has the existing code 1537 and the created code 1538. That is, reprocessing has been completed. As a result, the code of the second color component is received by the memory. The drawing and the processing of the first color component remain suspended until this moment.

Here, the processing of the line N will be described. Since the overflow is generated during the processing of the line N, the codes of the line N are only partially stored in the memory of the second color component. In the example of FIG. 15, this state is shown as that the created code 1534 of Nth line the drawing process 1500b exceeds the existing code 1533.

Therefore, the following process is performed.

(1) For the processing of the line N, the drawing result is reprocessed using the quantization module 922 and the encoding module 924 with the quantization step size Q1.

(2) The processing may be controlled to prevent the overflow. Specifically, whether there is a possibility of an overflow occurring in the next line is detected, that is, the remaining amount of the memory is less than the maximum code length of the line. If there is a possibility, control may return to the reprocessing. In this manner, it is possible to reliably reserve the lines N in the memory, and thus, cover up to lines N in the reprocessing. This control is performed by the control module 940.

(3) Alternatively, the codes already stored in the memory at the end of encoding of line N are reprocessed, and the overflow part is reprocessed using the quantization module 922 and the encoding module 924 with the quantization step size Q1 based on the drawing result.

In the (N+1)th line drawing process 1500e, the drawing state 1510 is a "drawing process," the code memory 1521 of the first color component state 1520 has the existing code 1525 and the created code 1526, and the code memory 1531 of the second color component state 1530 has the existing code 1539 and the created code 1540. That is, while the processing of line (N+1)th is equivalent to that of the first line drawing process 1500a, there is a difference in that the quantization parameter of the second color component processed using Q1.

Third Exemplary Embodiment

Figure 13:
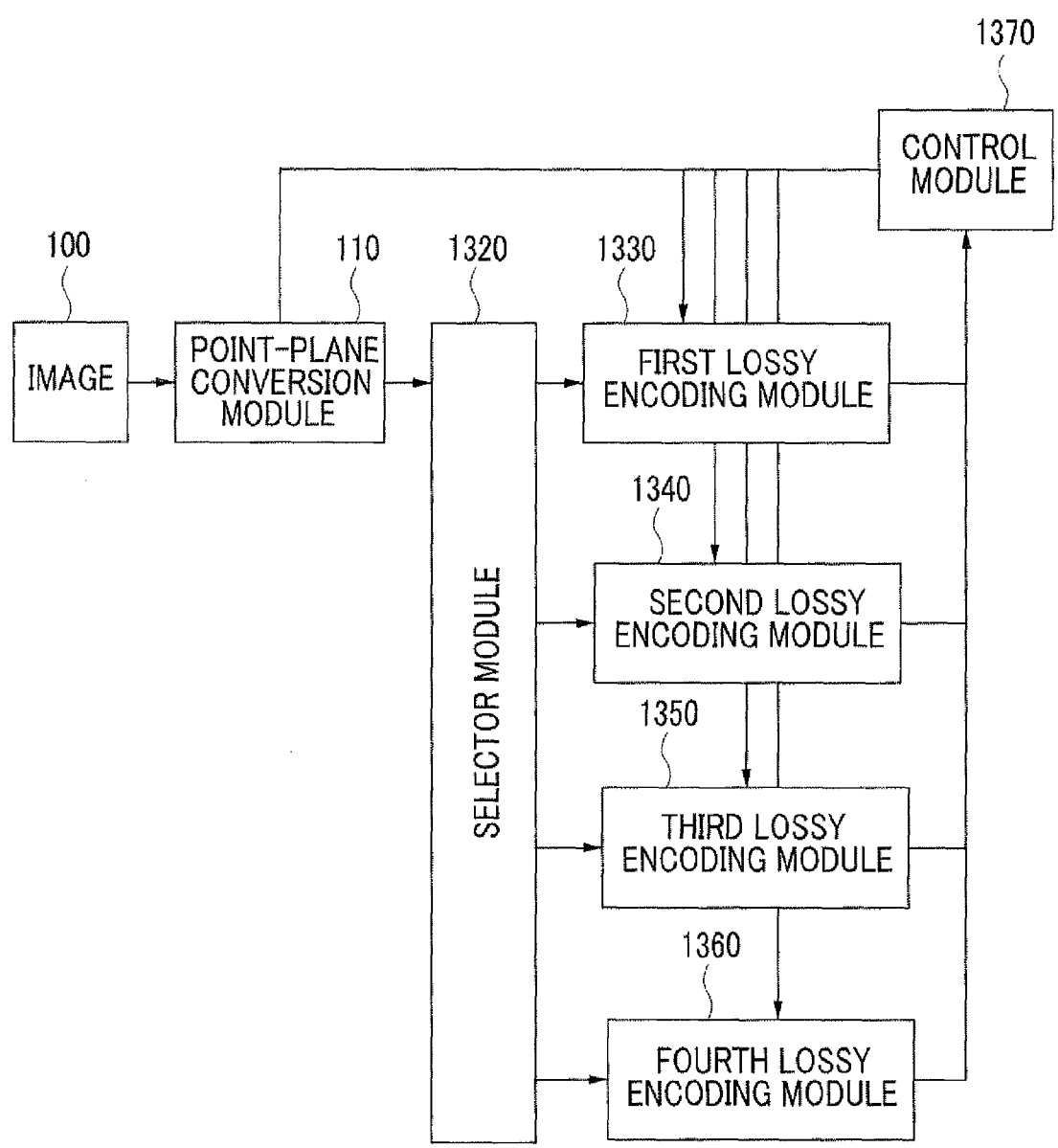
FIG. 13 is a conceptual modular configuration diagram illustrating an exemplary configuration according to a third exemplary embodiment.

FIG. 13 is a conceptual modular configuration diagram illustrating an exemplary configuration according to a third exemplary embodiment. The image processing apparatus according to the third exemplary embodiment performs a lossy encoding for the image and, as shown in the example of FIG. 13, includes a point-plane conversion module 110, a selector module 1320, a first lossy encoding module 1330, a second lossy encoding module 1340, a third lossy encoding module 1350, a fourth lossy encoding module 1360, and a control module 1370.

Description will be made for a case where the third exemplary embodiment is applied to a system which handles the image having a different number of colors such as a gray image, a two-color image, a four-color image, and a multicolor image having four or more colors. Since the lossy encoding module according to the third exemplary embodiment may operate independently, only the maximum number of colors handled by the system is prepared, and a necessary portion is used depending on the target image.

The point-plane conversion module 110 is connected to the selector module 1320, the first lossy encoding module 1330, the second lossy encoding module 1340, the third lossy encoding module 1350, the fourth lossy encoding module 1360, and the control module 1370.

The selector module 1320 is connected to the point-plane conversion module 110, the first lossy encoding module 1330, the second lossy encoding module 1340, the third lossy encoding module 1350, and the fourth lossy encoding module 1360. The selector module 1320 selects the lossy encoding module for performing the lossy encoding processing from plural lossy encoding modules depending on the number of color components. Depending on the number of colors of the target image 100, the image data of colors corresponding to the necessary lossy encoding module are transmitted. In this case, the data are not transmitted to an unnecessary lossy encoding module. As a result, in the exemplary configuration example of FIG. 13, for example, there are four lossy encoding modules so that it is possible to respond to the image of one to four colors.

The first lossy encoding module 1330, the second lossy encoding module 1340, the third lossy encoding module 1350, and the fourth lossy encoding module 1360 are connected to the point-plane conversion module 110, the selector module 1320, and the control module 1370 and perform the processing similar to that of aforementioned lossy encoding module (first and second lossy encoding modules 120 and 130 according to the first exemplary embodiment or first and second lossy encoding modules 920 and 930 according to the second exemplary embodiment).

The control module 1370 is connected to the point-plane conversion module 110, the first lossy encoding module 1330, the second lossy encoding module 1340, the third lossy encoding module 1350, and the fourth lossy encoding module 1360. The control module 1370 performs the processing similar to that of the control module 140 or the control module 940 described above. However, the control module 1370 only controls the lossy encoding module selected by the selector module 1320.

Fourth Exemplary Embodiment

Figure 14:
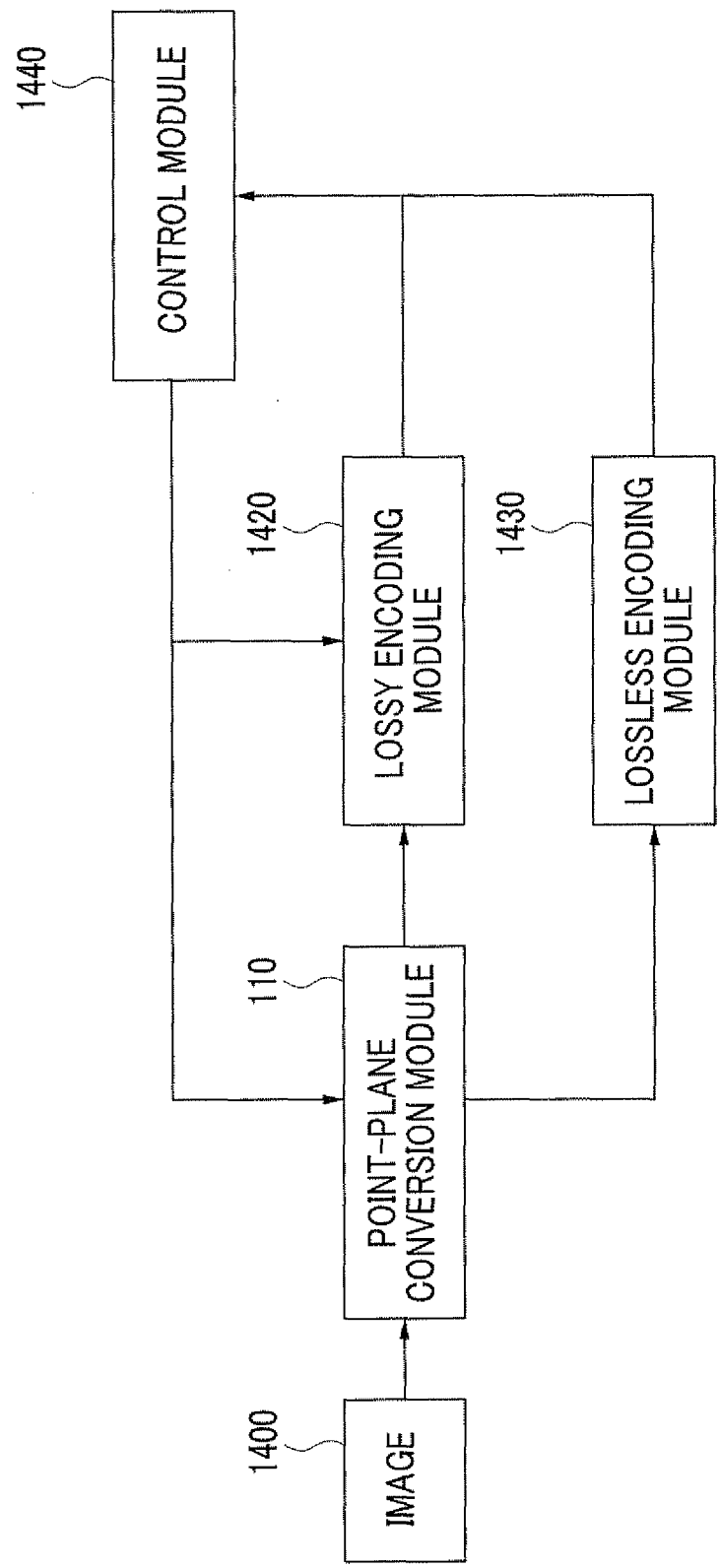
FIG. 14 is a conceptual modular configuration diagram illustrating an exemplary configuration according to a fourth exemplary embodiment.

FIG. 14 is a conceptual modular configuration diagram illustrating an exemplary configuration according to the fourth exemplary embodiment. The image processing apparatus according to the fourth exemplary embodiment includes a point-plane conversion module 110, a lossy encoding module 1420, a lossless encoding module 1430, and a control module 1440 in the lossy encoding of the image as shown in FIG. 14. Additional information may be included in the target image. For example, as additional information for each pixel, there may be attribute information (also, referred to as "tag information") indicating what object corresponds to that pixel, transparency information for transmission/synthesis, and the like. Such additional information may not be allowed to perform the quantization and the lossy encoding. In this regard, according to the fourth exemplary embodiment, the lossless encoding module is additionally provided in a group of the lossy encoding modules.

The point-plane conversion module 110 is connected to the lossy encoding module 1420, the lossless encoding module 1430, and the control module 1440. The image 1400 received by the point-plane conversion module 110 includes additional information.

The lossy encoding module 1420 is connected to the point-plane conversion module 110 and the control module 1440. Naturally, plural lossy encoding modules in the aforementioned exemplary embodiments are included in the lossy encoding module 1420. The lossy encoding module 1420 performs the processing similar to that of the first lossy encoding module 120, the second lossy encoding module 130, the first lossy encoding module 920, the second lossy encoding module 930, the first lossy encoding module 1330, and the second lossy encoding module 1340 described above.

The lossless encoding module 1430 is connected to the point-plane conversion module 110 and the control module 1440. The lossless encoding module 1430 performs the lossless encoding processing for the additional information within the image space 1400.

The control module 1440 is connected to the point-plane conversion module 110, the lossy encoding module 1420, and the lossless encoding module 1430. The control module 1440 performs the processing similar to that of the point-plane conversion module 110, the control module 940, and the control module 1370 described above. However, since there is no controllable quantization step size in the lossless encoding module 1430, the control module 1440 monitors the lossless encoding module 1430 regarding the operation termination and creation of the created code amount.

Figure 16:
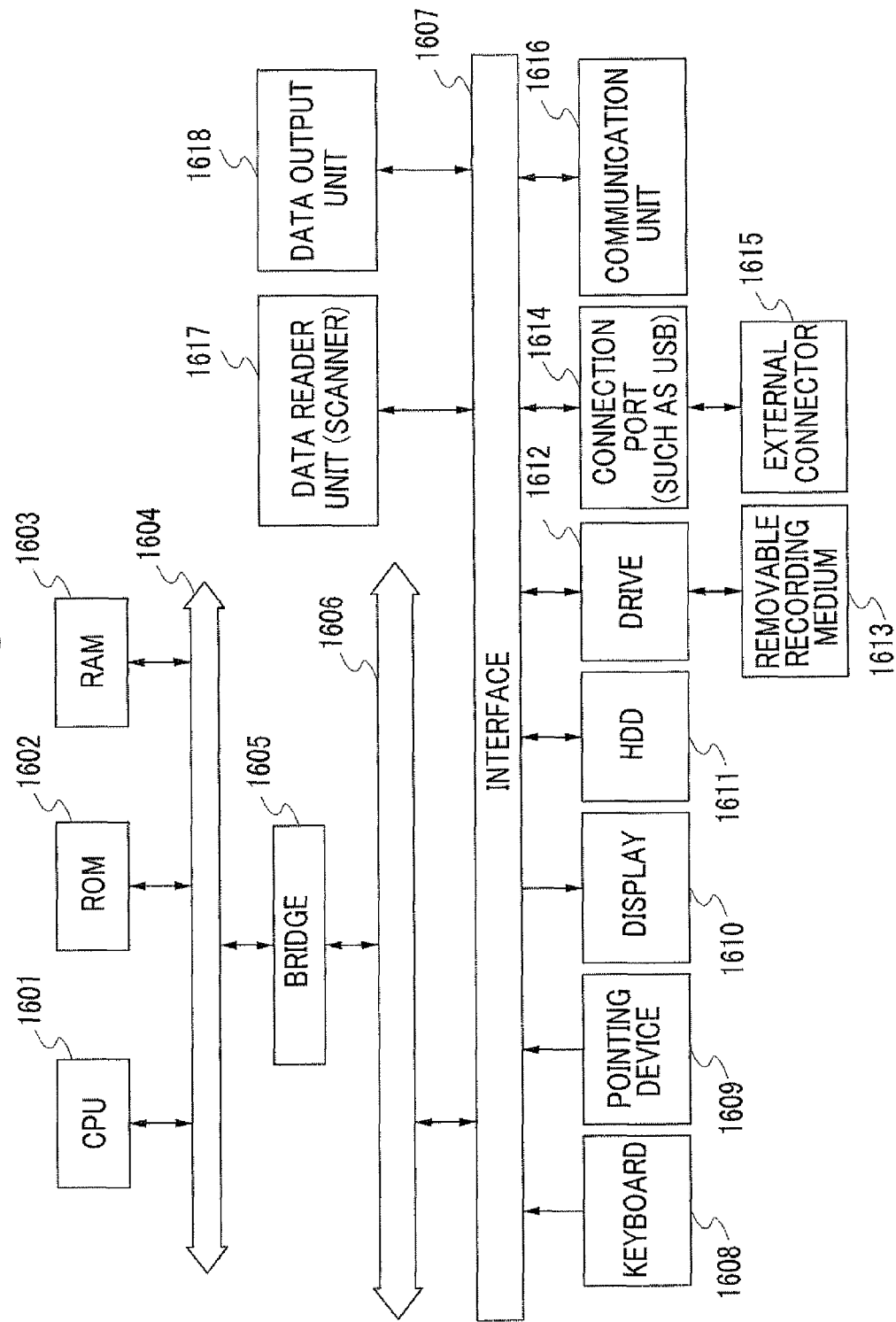
FIG. 16 is a block diagram illustrating an exemplary hardware configuration of the computer according to the present exemplary embodiment.

An exemplary hardware configuration of the image processing apparatus according to the present exemplary embodiment will be described with reference to FIG. 16. The configuration of FIG. 16 is embodied as, for example, a personal computer (PC) or the like, and illustrates an exemplary hardware configuration including a data read unit 1617 such as a scanner and a data output unit 1618 such as a printer.

The central processing unit (CPU) 1601 is a control unit for executing the processing based on the computer program for describing the execution sequence of each module, such as each module described in the aforementioned exemplary embodiments, that is the point-plane conversion module 110, the first lossy encoding module 120, the second lossy encoding module 130, the control module 140, the pass/drawing module 210, the color conversion module 220, the point-plane conversion module 230, the frequency analysis module 310, the first processing module 320, the second processing module 330, the quantization module 922, the encoding module 924, the decoding module 928, the quantization module 932, the encoding module 934, the decoding module 938, the selector module 1320, the first lossy encoding module 1330, the second lossy encoding module 1340, the third lossy encoding module 1350, the fourth lossy encoding module 1360, the lossy encoding module 1420, the lossless encoding module 1430, the control module 1440, and the like.

The read only memory (ROM) 1602 stores a program or an operational parameter used by the CPU 1601. The random access memory (RAM) 1603 stores a program used in the execution of the CPU 1601, a parameter changed appropriately in the execution thereof, or the like. They are interconnected by the host bus 1604 such as the CPU bus.

The host bus 1604 is connected to the external bus 1606 such as the peripheral component interconnect/interface (PCI) bus through a bridge 1605.

The pointing device 1609 such as a keyboard 1608 and a mouse are input devices manipulated by an operator. The display 1610 includes a liquid crystal display, a cathode ray tube (CRT), or the like and displays various kinds of information with text or image information.

The hard disk drive (HDD) 1611 has a hard disk built in, drives the hard disk, and records or reproduces the program or information executed by the CPU 1601. The received images, code images, or the like are stored on the hard disk. In addition, various data processing programs or various computer programs are stored therein.

The drive 1612 reads data or a program recorded in the mounted magnetic disk, an optical disc, a magneto-optical disc, or a removable recording medium 1613 such as a semiconductor memory and provides the data or program to the RAM 1603 connected through the interface 1607, the external bus 1606, the bridge 1605, and the host bus 1604. A removable recording medium 1613 may be used as the data recording area similar to the hard disk.

The connection port 1614 is a port for connecting the external connector 1615 and includes a connection unit such as USB and IEEE 1394. The connection port 1614 is connected to the CPU 1601 through the interface 1607, the external bus 1606, the bridge 1605, the host bus 1604, or the like. The communication unit 1616 is connected to the communication line and performs the data communication processing with an external side. The data reader unit 1617 is, for example, a scanner and performs the reading process of the document. The data output unit 1618 is, for example, a printer, and performs the output process of the document data.

In addition, the hardware configuration of the image processing apparatus of FIG. 16 illustrates a single configuration example. The present exemplary embodiment is not limited to the configuration of FIG. 16 and may be executable modular configuration described in the present exemplary embodiment. For example, some modules may include dedicated hardware (for example, application specific integrated circuit (ASIC)), some modules maybe in the external system connected with communication line, and further, plural systems of FIG. 16 may be connected to and cooperate with each other through communication lines. In addition, some modules may be built into a copy machine, a fax, a scanner, a printer, and a multi-function peripheral (image processing apparatus having two or more functions of a scanner, a printer, a copy machine, a facsimile, and the like).

In addition, in the aforementioned description of exemplary embodiments, notations used for comparison with a predetermined value, "equal to or greater than", "equal to or smaller than", "greater than", and "smaller than (less than)" may be used as "greater than", "smaller than (less than)", "equal to or greater than", and "equal to or smaller than," respectively, unless there is a conflict in their combination.

In addition, the aforementioned various exemplary embodiments may be combined (for example, a certain module in any exemplary embodiment may be added to or replaced with any module in other exemplary embodiments). Techniques described in the related art may be employed as a processing content of each module. In particular, the conventional techniques may be used for the quantization step size and the re-encoding process. For example, the following invention (means) may be added. In addition, the quantization intensity and the encoding coefficient are examples of the aforementioned processing variables.

[A1]

An image processing apparatus including:

a criterion setting unit that sets a selection criterion in order to select a quantization intensity based on a characteristic amount of an entered image;

an intensity selection unit that selects any side of plural quantization intensities regarding each part of image area of the entered image based on a selection criterion set by the criterion setting unit; and a quantization unit that quantizes image information of each part of image area with a quantization intensity selected by the intensity selection unit.

[A2]

The image processing apparatus according to [A1], wherein the intensity selection unit selects quantization intensity for each part of image area based on the selection criterion set by the criterion setting unit and a characteristic amount of each part of image area.

[A3]

The image processing apparatus according to [A1], wherein the criterion setting unit uses a grey scale range width included in each part of image area as the characteristic amount.

[A4]

The image processing apparatus according to [A1], further including:

an encoding unit that encodes image information quantized by the quantization unit;

a re-quantization determination unit that determines to re-quantize entered image if the code amount of image information encoded by the encoding unit exceeds an upper limit;

wherein the criterion setting unit updates the selection criterion if it is determined to re-quantize by the re-quantization determination unit.

[A5]

The image processing apparatus according to [A2], further including:

a characteristic amount computation unit that calculates characteristic amounts for each part of image area;

wherein the criterion setting unit sets a selection criterion based on a distribution of characteristic amounts calculated by the characteristic amount computation unit, the intensity selection unit selects the quantization intensity based on the characteristic amount of each part of image area calculated by the characteristic amount computation unit and the selection criterion set by the criterion setting unit.

[B1]

An information processing apparatus including:

an encoding unit that encodes encoding target information with a default encoding coefficient;

a determination unit that determines whether or not an encoding coefficient is changed at the timing at which some encoding target information is encoded by the encoding unit; and a control unit that controls the encoding unit so as to perform encoding process again with the another encoding coefficient if it is determined that encoding coefficient is changed by the determination unit.

[B2]

The information processing apparatus according to [B1], wherein the determination unit determines whether or not an encoding coefficient is changed based on the code amount until the timing.

[B3]

The information processing apparatus according to [B2], wherein the determination unit estimates total code amount based on the code amount until the timing. If the estimated total code amount is outside of the default range, it is determined that the encoding coefficient is changed.

[B4]

The information processing apparatus according to [B3], wherein the uncoded information is image information, and the determination unit estimates total code amount based on the code amount until the timing, the size of image encoded until timing, and the size of overall image.

[B5]

The information processing apparatus according to [B3], wherein the determination unit estimates total code amount based on the code amount until the timing, the code amount encoded until timing with the other encoding coefficient, and the total code amount encoded with the other encoding coefficient.

[B6]

The information processing apparatus further including:

plural encoding units having different encode efficiencies;

a selection unit that selects the encoding unit to stop the encoding processing among plural encoding units at the timing when some encoding target information is encoded by each encoding unit; and a control unit that controls so as to stop the encoding processing of the encoding unit selected by the selection unit.

In addition, the aforementioned program may be stored in the recording medium or provided through the communication unit. In this case, the aforementioned program may be regarded as, for example, the invention of "a computer-readable recording medium recording a program."

A "computer-readable recording medium recording the program" refers to a recording medium readable by a computer, where the program is recorded, used for installation, execution, and distribution of the program.

In addition, the recording medium includes, for example, for a Digital Versatile Disc (DVD), "DVD-R, DVD-RW, DVD-RAM or the like" which are standards established by the DVD forum, "DVD+R, DVD+RW, or the like" which are standards established for DVD+RW, for a compact disc (CD), a CD read only memory (CD-ROM), a CD recordable (CD-R), a CD rewritable (CD-RW) or the like, a Blu-ray Disc (registered trademark), a magneto-optical disc (MO), a flexible disk (FD), a magnetic tape, a hard disk, a read only memory (ROM), an electrically erasable programmable read-only memory (EEPROM (registered trademark)), a flash memory, a random access memory (RAM), a secure digital (SD) memory card, and the like.

The aforementioned program or a part thereof may be recorded in the recording medium and then be stored or distributed. The aforementioned program or a part thereof may be transmitted using a communication line such as a wired network such as a Local Area Network (LAN), a Metropolitan Area Network (MAN), a Wide Area Network (WAN), the Internet, an intranet, and an extranet, a wireless network, a transmission medium, or a combination thereof, or through carrier waves.

Furthermore, the program may be a part of other program or may be recorded on the recording medium along with a separate program. The program may be dividingly recorded on plural recording media. In addition, the program may be recorded in any aspect if it can be recovered through compression, encryption, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a receiving unit that receives a point sequence image;

a point-plane conversion unit that performs a point-plane conversion processing for the image received by the receiving unit;

a plurality of lossy encoding units that perform a lossy encoding processing for the point-plane conversion image by using the point-plane conversion unit, each of the lossy encoding units corresponds to one of a plurality of color components; and a control unit that performs control such that transmission of the image to the lossy encoding unit from the point-plane conversion unit is controlled to synchronize lossy encoding processings of the plurality of lossy encoding units by maintaining a difference between quantization steps of the respective lossy encoding units to be within a predetermined value, and each lossy encoding unit changes processing variables used in the encoding processing based on a code amount of the processing result of the lossy encoding unit.

2. The image processing apparatus according to claim 1, wherein, in a point-plane conversion processing of the point-plane conversion unit, the point sequence image is converted into a plane image for each color component,
- each of the plurality of lossy encoding units is a lossy encoding unit corresponding to each color component,
- the control unit performs control to change the processing variables used in the lossy encoding unit based on the code amount for each color component, a sum of the code amounts for each color components, or both of the same.

3. The image processing apparatus according to claim 2, further comprising:
- a storage unit that stores a code of a result of the lossy encoding processing of each of the lossy encoding units; and
- a decoding unit that decodes the code stored in the storage unit,
- wherein the storage unit and the decoding unit are provided to match each of the lossy encoding units, and
- the lossy encoding unit performs a lossy encoding processing, as a target for the image decoded by the decoding unit based on controlling of the control unit.

4. The image processing apparatus according to claim 3, wherein the image received by the receiving unit includes additional information, and
- the image processing apparatus further includes a lossless encoding unit that performs a lossless encoding processing for the additional information.

5. The image processing apparatus according to claim 3, further comprising:
- a selection unit that selects a lossy encoding unit in the plurality of lossy encoding units to perform the lossy encoding processing in accordance with the number of color components.

6. The image processing apparatus according to claim 5, wherein the image received by the receiving unit includes additional information, and
- the image processing apparatus further includes a lossless encoding unit that performs a lossless encoding processing for the additional information.

7. The image processing apparatus according to claim 2, further comprising:
- a selection unit that selects a lossy encoding unit in the plurality of lossy encoding units to perform the lossy encoding processing in accordance with the number of color components.

8. The image processing apparatus according to claim 7, wherein the image received by the receiving unit includes additional information, and
- the image processing apparatus further includes a lossless encoding unit that performs a lossless encoding processing for the additional information.

9. The image processing apparatus according to claim 2, wherein the image received by the receiving unit includes additional information, and
- the image processing apparatus further includes a lossless encoding unit that performs a lossless encoding processing for the additional information.

10. The image processing apparatus according to claim 1, further comprising:
- a storage unit that stores a code of a result of the lossy encoding processing of each of the lossy encoding units; and
- a decoding unit that decodes the code stored in the storage unit,
- wherein the storage unit and the decoding unit are provided to match each of the lossy encoding units, and
- the lossy encoding unit performs a lossy encoding processing, as a target for the image decoded by the decoding unit based on controlling of the control unit.

11. The image processing apparatus according to claim 10, further comprising:
- a selection unit that selects a lossy encoding unit in the plurality of lossy encoding units to perform the lossy encoding processing in accordance with the number of color components.

12. The image processing apparatus according to claim 10, wherein the image received by the receiving unit includes additional information, and
- the image processing apparatus further includes a lossless encoding unit that performs a lossless encoding processing for the additional information.

13. The image processing apparatus according to claim 11, wherein the image received by the receiving unit includes additional information, and
- the image processing apparatus further includes a lossless encoding unit that performs a lossless encoding processing for the additional information.

14. The image processing apparatus according to claim 1, wherein the image received by the receiving unit includes additional information, and
- the image processing apparatus further includes a lossless encoding unit that performs a lossless encoding processing for the additional information.

15. The image processing apparatus according to claim 1, wherein the control unit performs control to select between a first quantization method or a second quantization method used in the lossy encoding units depending on whether a code amount of an image block is above or below a predetermined characteristic amount.

16. A non-transitory computer readable medium storing an image processing program that causes a computer to function as: a receiving unit that receives a point sequence image;
- a point-plane conversion unit that performs a point-plane conversion processing for the image received by the receiving unit;
- a plurality of lossy encoding units that perform a lossy encoding processing for the point-plane conversion image by using the point-plane conversion unit each of the lossy encoding units corresponds to one of a plurality of color components; and
- a control unit that performs control such that transmission of the image to the lossy encoding unit from the point-plane conversion unit is controlled to synchronize lossy encoding processings of the plurality of lossy encoding units by maintaining a difference between quantization steps of the respective lossy encoding units to be within a predetermined value, and each lossy encoding unit changes processing variables used in the encoding processing based on a code amount of the processing result of the lossy encoding unit.

17. The non-transitory computer readable medium according to claim 16, wherein the control unit performs control to select between a first quantization method or a second quantization method used in the lossy encoding units depending on whether a code amount of an image block is above or below a predetermined characteristic amount.

18. An image processing method comprising:
receiving a point sequence image;
performing a point-plane conversion processing for the received image;
performing a lossy encoding processing for the point-plane conversion image with a plurality of lossy encoding units, each of the lossy encoding units corresponds to one of a plurality of color components; and
performing control such that transmission of the image to the lossy encoding step from the point-plane conversion processing step is controlled to synchronize lossy encoding processings of the lossy encoding step by maintaining a difference between quantization steps of the respective lossy encoding units to be within a predetermined value, and the lossy encoding step changes processing variables used in the encoding processing step based on a code amount of the processing result of the lossy encoding step.

19. The image processing method according to claim 18, further comprising performing control to select between a first quantization method or a second quantization method used in the lossy encoding units depending on whether a code amount of an image block is above or below a predetermined characteristic amount.

* * * * *